US011161118B2

(12) United States Patent
Fujita et al.

(10) Patent No.: US 11,161,118 B2
(45) Date of Patent: Nov. 2, 2021

(54) AUTOMATIC ANALYSIS DEVICE

(71) Applicant: Hitachi High-Technologies Corporation, Tokyo (JP)

(72) Inventors: Hiroki Fujita, Tokyo (JP); Toshiharu Suzuki, Tokyo (JP); Takenori Okusa, Tokyo (JP); Shunsuke Sasaki, Tokyo (JP); Yoshihiro Yamashita, Tokyo (JP); Kenta Imai, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 200 days.

(21) Appl. No.: 16/477,535

(22) PCT Filed: Feb. 15, 2018

(86) PCT No.: PCT/JP2018/005242
§ 371 (c)(1),
(2) Date: Jul. 12, 2019

(87) PCT Pub. No.: WO2018/173560
PCT Pub. Date: Sep. 27, 2018

(65) Prior Publication Data
US 2019/0351419 A1    Nov. 21, 2019

(30) Foreign Application Priority Data

Mar. 23, 2017 (JP) .............................. JP2017-056810

(51) Int. Cl.
*B01L 3/00* (2006.01)
*G01N 35/00* (2006.01)
*G01N 35/10* (2006.01)

(52) U.S. Cl.
CPC .......... *B01L 3/52* (2013.01); *G01N 35/00584* (2013.01); *G01N 35/1002* (2013.01);
(Continued)

(58) Field of Classification Search
CPC ...... B01L 3/52; B01L 3/50; B01L 3/00; B01L 2200/143; B01L 2300/0609; G01N 35/00584; G01N 35/1002; G01N 35/1009
(Continued)

(56) References Cited

U.S. PATENT DOCUMENTS 5,428,993 A     7/1995  Kobashi
2012/0003121 A1  1/2012  Shibata et al.
(Continued)

FOREIGN PATENT DOCUMENTS

JP    05-84864 U    11/1993
JP    2009-58317 A   3/2009
(Continued)

OTHER PUBLICATIONS

International Search Report of PCT/JP2018/005242 dated May 15, 2018.
(Continued)

*Primary Examiner* — Christine T Mui
(74) *Attorney, Agent, or Firm* — Mattingly & Malur, PC (57) ABSTRACT

The mixing of reagents with each other in the reagent storage flow paths of an automatic analyzer is suppressed before and after exchange of the reagents, which are capable of being replenished without stopping analysis. An exchangeable reagent container that accommodates a reagent is connected to a reagent storage flow path that stores a portion of the reagent. The reagent storage flow path has first and second flow paths in which the second flow path is branched from the first flow path. A reagent syringe applies a negative or a positive pressure to the first and second flow paths; and a valve controls the flow path through which the reagent is sent. As a result, the reagent supplied to a measurement portion at a predetermined timing is switched from the reagent container to the reagent storage flow path wherein the reagent can be supplied without stopping analysis.

12 Claims, 8 Drawing Sheets

(52) U.S. Cl.
CPC .... *G01N 35/1009* (2013.01); *B01L 2200/143* (2013.01); *B01L 2300/0609* (2013.01); *B01L 2300/0663* (2013.01); *B01L 2300/0877* (2013.01); *B01L 2400/06* (2013.01)

(58) Field of Classification Search
USPC .......................................................... 422/67
See application file for complete search history.

(56) References Cited

U.S. PATENT DOCUMENTS

| | | | |
|---|---|---|---|
| 2015/0037214 A1* | 2/2015 | Sakashita | G01N 35/08 422/67 |
| 2015/0293135 A1* | 10/2015 | Yamashita | G01N 35/00722 702/184 |
| 2018/0011121 A1 | 1/2018 | Kuroda et al. | |

FOREIGN PATENT DOCUMENTS

| | | |
|---|---|---|
| JP | 2014-238408 A | 12/2014 |
| WO | 2010/107042 A1 | 9/2010 |
| WO | 2016/136290 A1 | 9/2016 |

OTHER PUBLICATIONS

Extended European Search Report received in corresponding European Application No. 18772316.8 dated Dec. 2, 2020.

\* cited by examiner

AUTOMATIC ANALYSIS DEVICE

TECHNICAL FIELD

The present invention relates to an automatic analysis device which performs qualitative/quantitative analysis of a biological sample such as blood or urine.

BACKGROUND ART

The automatic analysis device performs qualitative/quantitative analysis by adding a reagent which specifically reacts with a specific component contained in a biological sample such as blood or urine, and causing it to react and thereby measuring the absorbance or amount of luminescence of a reaction liquid.

In order to enable many analyses to be performed, generally the automatic analysis device has a casing to house extra external reagents or detergents in the device in addition to reagents for analysis which correspond to test items. In an ordinary test room, the manager of the device checks the reagent and detergent previously loaded in the device and loads the required amounts for daily analysis. If shortage of the reagent or detergent should occur during analysis, it is necessary to stop the analysis and refill the reagent or detergent. In this case, the minimum required amount of reagent or detergent must be refilled promptly.

Because of its high processing capability, a large automatic analysis device consumes a large quantity of consumables and thus it is often structured to be connected to a plurality of containers accommodating a reagent or detergent of the same type. In this case, the user cannot replace the container from which a reagent or detergent is being supplied, but can replace a container not in use. Therefore, the reagent or detergent can be exchanged without stopping the analysis, thereby preventing a decline in analysis throughput.

On the other hand, a small automatic analysis device holds consumables for use in the device, the amount of which is limited to the requisite minimum, from the viewpoint of space saving. This is the same for a reagent or detergent and because of this limitation to the requisite minimum, it is desirable that the device should not be connected to a plurality of containers accommodating the same type of reagent or detergent. In such a device, the minimum required amount of consumables must be refilled without stopping the analysis, just in case of shortage. In the prior art, an automatic analysis device which enables exchange of reagent containers of the same type as those loaded in the device without stopping the analysis is known (for example, see Patent Literature 1).

CITATION LIST

Patent Literature

Patent Literature 1: Japanese Patent Application Laid-Open No. 2014-238408

SUMMARY OF INVENTION

Technical Problem

In the automatic analysis device described in Patent Literature 1, a reagent retaining section is provided between various reagent containers and a measuring section and the reagent in a reagent container is always supplied through the reagent retaining section to the measuring section. Consequently, there is a sufficient amount of reagent in the reagent retaining section when the reagent becomes empty, so the reagent container can be exchanged without stopping the analysis.

However, no consideration is given to mixing of reagents in the reagent retaining section before and after exchange. Depending on the type of reagent, mixing of reagents of the same type from different lots may cause a change in pH and easily damage the reagent and in the worst case, the use of the damaged reagent may result in a deterioration in analysis performance.

An object of the present invention is to provide an automatic analysis device which can reduce the deterioration in analysis performance and refill a reagent or detergent without stopping an analysis.

Solution to Problem

In view of the above problem, the present invention is characterized as follows. Specifically, the device includes: a reagent container holding portion that exchangeably holds a reagent container accommodating a reagent; a first flow path that supplies the reagent in the reagent container to a measurement portion; a second flow path that is branched off from the first flow path and can store a portion of the reagent in the reagent container; liquid sending means for sending the reagent by applying pressure to the first flow path and the second flow path; a valve that is at least provided on the first flow path and the second flow path; and control means for controlling the valve and the liquid sending means so that a supply source which supplies a reagent to the measurement portion at a predetermined timing is switched from the reagent container to the second flow path.

Advantageous Effects of Invention

According to the present invention, the deterioration in analysis performance attributable to degradation of a reagent is reduced and the reagent can be exchanged without stopping an analysis. Other issues, elements and advantageous effects than the above will become more fully understood from the description of an embodiment given hereinbelow.

BRIEF DESCRIPTION OF DRAWINGS

FIG. 2-1 is a view illustrating an installation location of an external reagent container used in the automatic analysis device in the embodiment of the present invention.

FIG. 2-2 is a view illustrating a configuration of a surrounding portion of the external reagent container used in the automatic analysis device in the embodiment of the present invention.

DESCRIPTION OF EMBODIMENTS

Next, the configuration and operation of an automatic analysis device 100 as an embodiment of the present invention will be described referring to FIGS. 1 to 8. The automatic analysis device 100 performs different types of analysis such as biochemical and immune analyses in a single system. The same elements are designated by the same reference signs.

Figure 1:
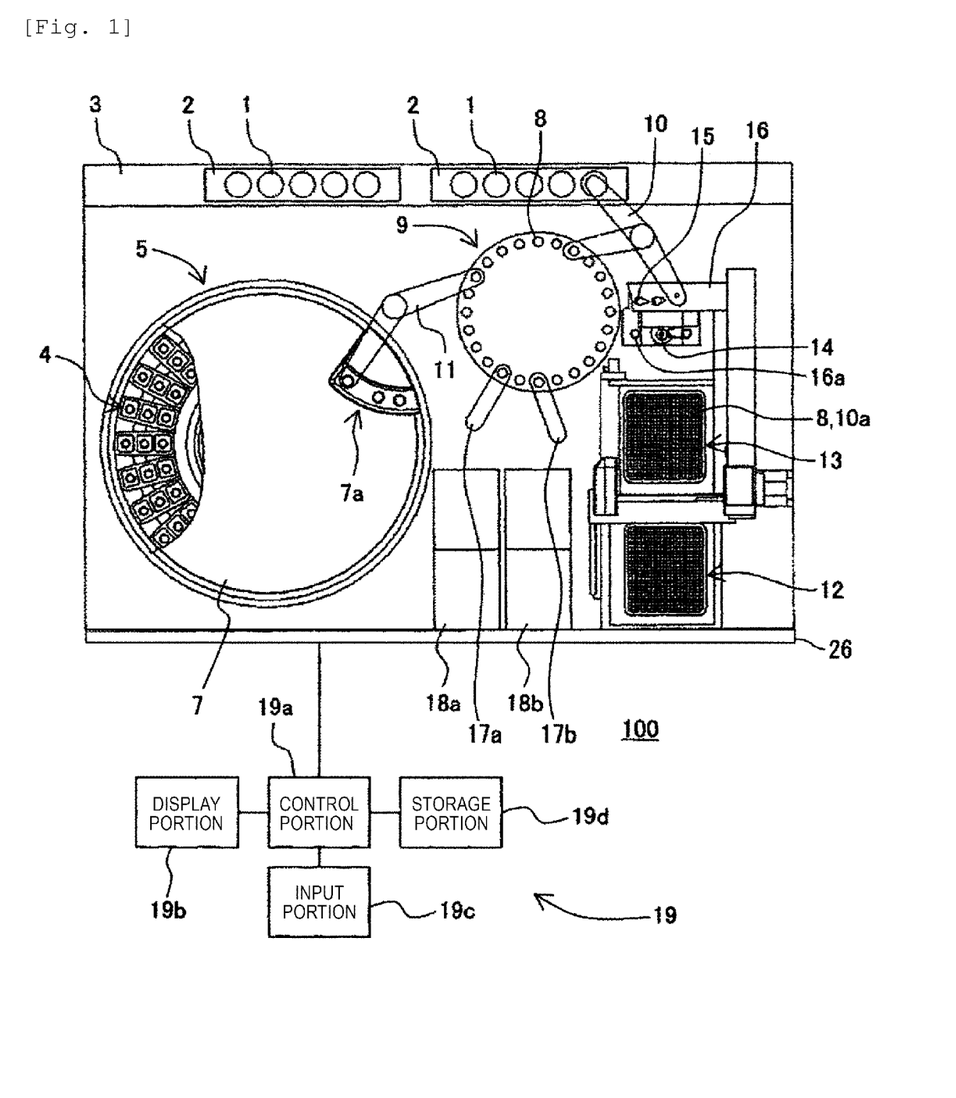
FIG. 1 is a configuration view illustrating an automatic analysis device in an embodiment of the present invention.
Figure 21:
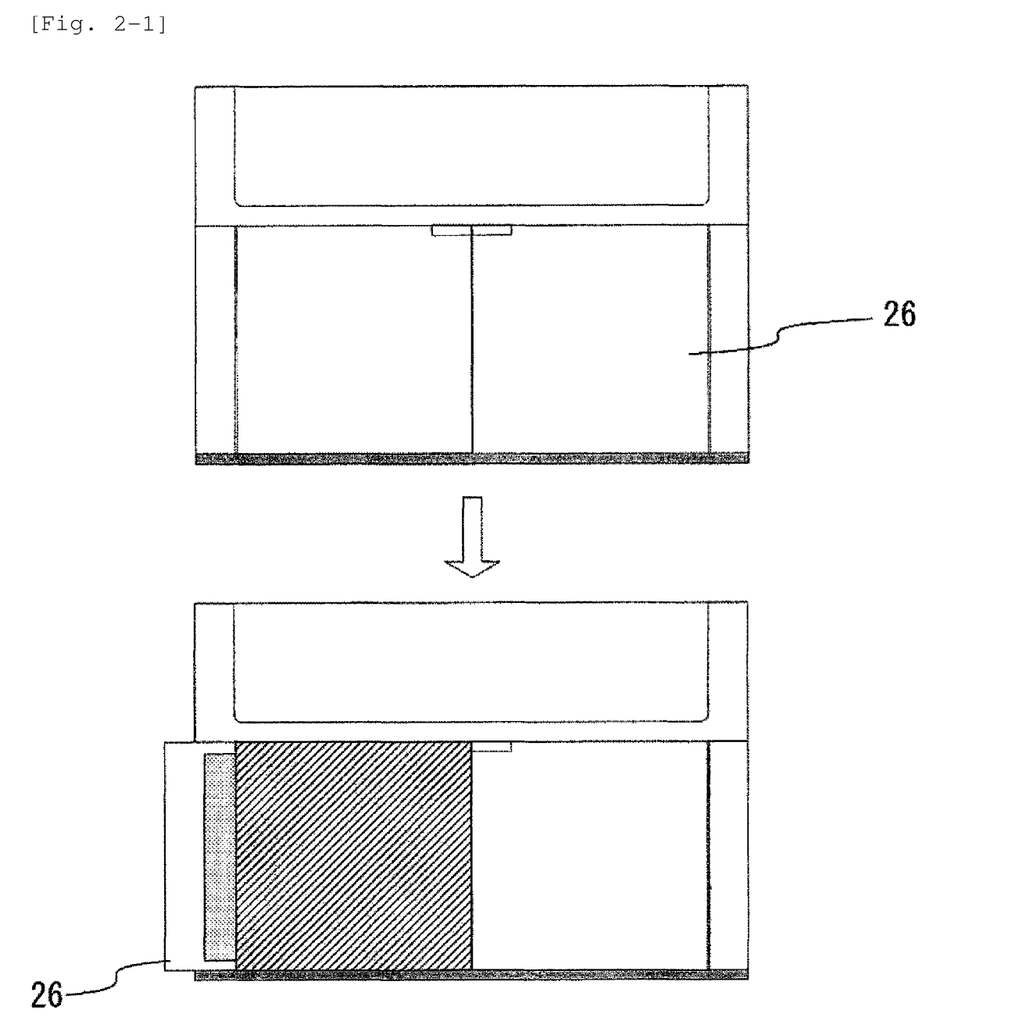
Figure 22:
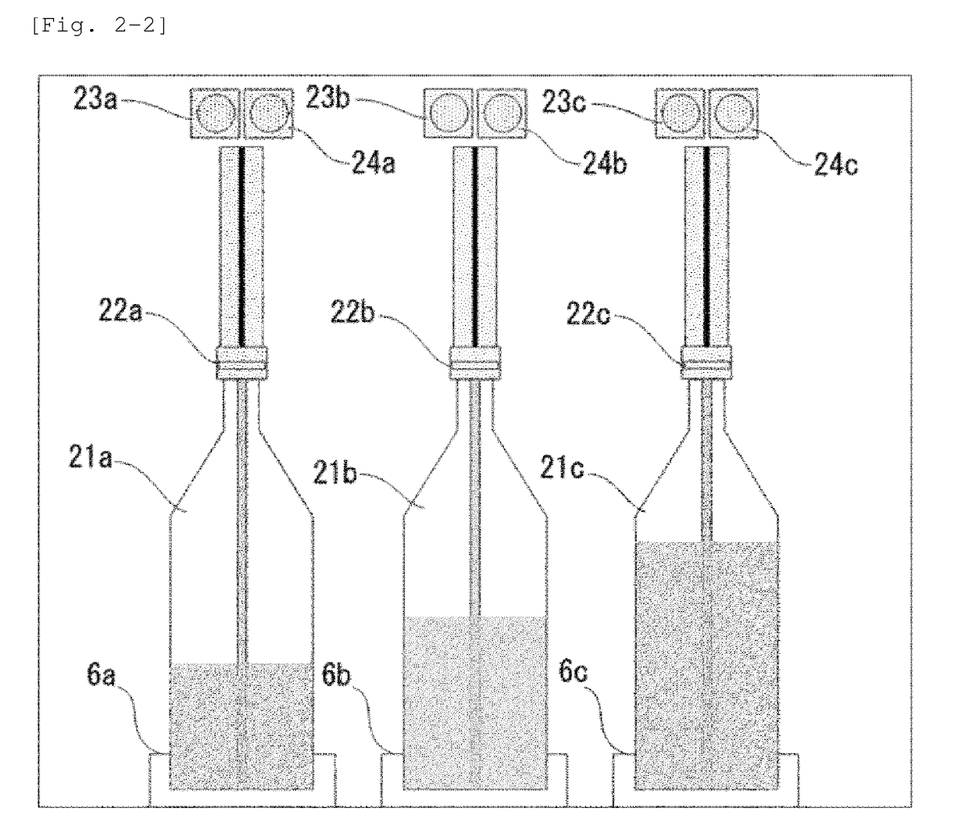

First, the general configuration of the automatic analysis device 100 will be described referring to FIG. 1, FIG. 2-1, and FIG. 2-2. FIG. 1 is a configuration diagram of the automatic analysis device 100.

The automatic analysis device 100 includes: a rack transfer line 3 for transporting a sample container rack 2, reagent refrigerator 5, incubator disc 9, sample dispensing mechanism 10, reagent dispensing mechanism 11, reaction container/sample dispensing tip storage portion 12 for replenishment, reaction container/sample dispensing tip supply portion 13, reaction container stirring mechanism 14, discarding portion (hole) 15, transport mechanism 16, nozzles 17a, 17b, detection units 18a, 18b, control device 19, and front surface cover 26.

FIG. 2-1 is a general view of the automatic analysis device 100 when viewed from the front and FIG. 2-2 is an enlarged view of the inside of the device with the left side of the front surface cover 26 open when viewed from the front. When the front surface cover 26 is open, external reagent holders 6a, 6b, and 6c, tube lifters 22a, 22b, and 22c, first indicator attached switches 23a, 23b, and 23c, and second indicator attached switches 24a, 24b, and 24c are present for various external reagent containers 21a, 21b, and 21c. Different types of external reagent containers 21a, 21b, and 21c can be placed in 6a, 6b, and 6c. If the present invention can be embodied, the automatic analysis device may have another configuration, provided that one external reagent container 21a, 21b or 21c can be placed for one type. The external reagent containers 21a, 21b, and 21c here are not limited to reagents but they include containers for consumable liquids such as a detergent and diluting fluid which are loaded on the device.

The sample container rack 2 houses a plurality of sample containers 1 accommodating a biological sample such as blood or urine (hereinafter called a sample). The rack transfer line 3 transports the sample container rack 2.

The reagent refrigerator 5 (reagent container holding portion) is covered by a reagent refrigerator cover 7 and houses a plurality of reagent containers 4 accommodating various reagents for use in sample analysis while keeping them at a given temperature. Furthermore, the reagent refrigerator 5 is provided with a reagent container unsealing mechanism (not shown) for unsealing the reagent container 4 so that the cover of the reagent container 4 can be opened or closed inside the reagent refrigerator 5 and the deterioration of the reagent can be suppressed. The reagent refrigerator 5 is not limited to the disc type; instead, it may be of the serial type in which the reagent containers 4 are arranged in one or more rows.

The incubator disc 9 has a plurality of container holding holes capable of housing a plurality of reaction containers 8 for mixing of a sample and reagent which are arranged on a circumference and it is rotated intermittently so that a reaction container 8 is placed in a specified position according to the progress of analysis. At a spot where the incubator disc 9 stops, necessary processes for the steps of dispensing, stirring and analyzing the sample and reagent are performed.

The sample dispensing mechanism 10 includes an arm portion which rotates or moves up and down and a nozzle portion which sucks or discharges the sample. A sample dispensing tip 10a is attachable to or detachable from the front edge of the nozzle portion. The nozzle portion is moved down to the sample container 1 transported to the sample dispensing position by the rack transfer line 3 to suck the specified amount of sample, and the arm portion is rotated to discharge the sample into the reaction container 8 placed in the specified position of the incubator disc 9.

The reagent dispensing mechanism 11 has a nozzle portion which sucks or discharges a reagent. It discharges the specified amount of reagent sucked from a reagent container 4 by horizontal drive or vertical drive and suction/discharge operation through the reagent refrigerator cover opening portion 7a in the reagent refrigerator cover 7, into the reaction container 8 placed in the specified position of the incubator disc 9.

The reaction container stirring mechanism 14 stirs the reaction liquid accommodated in the reaction container 8 taken out of the incubator disc 9.

The reaction container/sample dispensing tip supply portion 13 houses a plurality of unused reaction containers 8 and sample dispensing tips 10a. The reaction container/sample dispensing tip storage portion 12 stands by for replenishment. After a sample dispensing tip 10a is attached to the nozzle front edge of the sample dispensing mechanism 10 and the sample in the sample container is sucked, the used sample dispensing tip 10a is discarded from the discarding portion 15. After the analysis is ended, the used reaction container 8 is also discarded through an exhaust hole in the same manner.

The transport mechanism 16 includes a gripper portion for gripping a sample dispensing tip 10a and a reaction container 8 which are housed in the reaction container/sample dispensing tip supply portion 13 and a drive portion for transporting the gripper mechanism along X, Y and Z axes. More specifically, the transport mechanism 16 is provided in a manner to be able to move in the X axis, Y axis and Z axis directions (not shown). The transport mechanism 16 transports a reaction container 8 housed in the reaction container/sample dispensing tip housing portion 13 to the incubator disc 9, discards a used reaction container 8 into the discarding portion 15, and transports an unused sample dispensing tip 10a to the tip mounting position 16a.

The nozzles 17a and 17b suck the reaction liquid and reagent mixed in a reaction container 8 in the incubator disc 9 and send them to the detection units 18a and 18b by rotational drive and vertical drive, respectively. The detection units 18a and 18b perform a detection process on the reaction liquid sucked by the nozzles 17a and 17b and sent to detect a specific component.

The control device 19 controls the operation of the entire automatic analysis device 100. The control device 19 includes a control portion 19a, display portion 19b, input portion 19c, and storage portion 19d. Details of the structure of the control device 19 will be described later referring to FIG. 4.

As shown in FIG. 2-2, when the front surface cover 26 is open, the external reagent holders 6a, 6b, and 6c on which the external reagent containers 21a, 21b, and 21c can be placed are present. Different types of external reagent containers 21a, 21b, and 21c can be placed on the external reagent holders 6a, 6b, and 6c. An external reagent container is a container which stores a reagent placed in a place other than in the reagent refrigerator. Specifically, it is a reagent container which stores, for example, about two liters of liquid such as a buffer fluid as a system reagent or a detergent, which is commonly used in plural test items.

Each of the tube lifters 22a, 22b, 22c can be moved up and down manually and with being lifted up, the external reagent holders 6a, 6b, 6c are placed on the external reagent containers 21a, 21b, 21c, respectively, and then, inserted inward from the opening of the external reagent containers 21a, 21b, 21c. As the reagent syringes 25a, 25b, 26c are pulled and pushed in this state, a reagent is supplied from the external reagent containers 21a, 21b, 21c to the flow path.

The first indicator attached switches 23a, 23b, and 23c located in the respective positions of the external reagent holders 6a, 6b, and 6c are pressed by the user to start reagent exchange. The indicators of the first indicator attached switches 23a, 23b, and 23c are, for example, LED lamps which can light yellow, flash, or turn off and the reagent exchange state is expressed by the indicators of the first indicator attached switches 23a, 23b, and 23c. For example, if the light of a first indicator attached switch is off, it indicates a state in which exchange of the external reagent container placed in the position of this first indicator attached switch can be started (state in which the reagent container is empty and a reagent is being supplied from a reagent storage flow path which will be described later). If the light of the first indicator attached switch is on, it indicates a state in which the external reagent container placed in the position of this first indicator attached switch cannot be exchanged (state in which the external reagent container is being used). If the first indicator attached switch is flashing, it indicates a state in which the external reagent container placed in the position of this first indicator attached switch is under exchange (state in which the user is accessing the external reagent container). The states expressed by the first indicator attached switches 23a, 23b, and 23c are not limited to those mentioned herein.

The second indicator attached switches located in the respective positions of the external reagent holders 6a, 6b, and 6c are pressed by the user at the time of completion of reagent exchange. The indicators of the second indicator attached switches 24a, 24b, and 24c are, for example, LED lamps which can light green, flash, or turn off. The reagent container state is expressed by the indicators of the second indicator attached switches 24a, 24b, and 24c. For example, if the light of a second indicator attached switch is off, it indicates a state in which the external reagent container placed in the position of this second indicator attached switch is being used for analysis. If the light of the second indicator attached switch is on, it indicates a state in which the external reagent container placed in the position of this second indicator attached switch is being exchanged by the user. In this embodiment, regarding the states expressed by the second indicator attached switches 24a, 24b, and 24c, any reagent container state is not allocated to flashing, but flashing may be allocated to a reagent container state. The states expressed by the second indicator attached switches 24a, 24b, and 24c are not limited to those mentioned herein.

Although this embodiment uses a hardware structure which combines an indicator and a switch, this is just an example and instead a hardware structure in which an indicator and a switch are separated may be used. Furthermore, although in this embodiment the first indicator attached switches 23a, 23b, and 23c are used as a trigger to start reagent exchange and the second indicator attached switches 24a, 24b, and 24c are used as a trigger to finish reagent exchange, the trigger to start reagent exchange and the trigger to finish reagent exchange are not limited to the abovementioned. For example, the trigger to start reagent exchange may be a sensor which can detect that the tube lifter 22a, 22b, 22c has been lifted and the trigger to finish reagent exchange may be a sensor which can detect that the tube lifter 22a, 22b, 22c has been pushed down.

Provided is a reader (not shown) which reads an individual identification marker (not shown, in this embodiment, RFID tag) attached to the back side of the external reagent container 21a, 21b, 21c placed on the external reagent holder 6a, 6b, 6c, respectively, and sends the identification information to the control portion 19a of the control device 19. A barcode label may be used as an individual identification marker for the external reagent container 21a, 21b, 21c. The identification information recorded in the individual identification marker includes a reagent identification number (identification code) to identify the reagent accommodated in the external reagent containers 21a, 21b, 21c, test item name corresponding to the accommodated reagent, reagent identification code, lot number, sequence number and so on.

Figure 3:
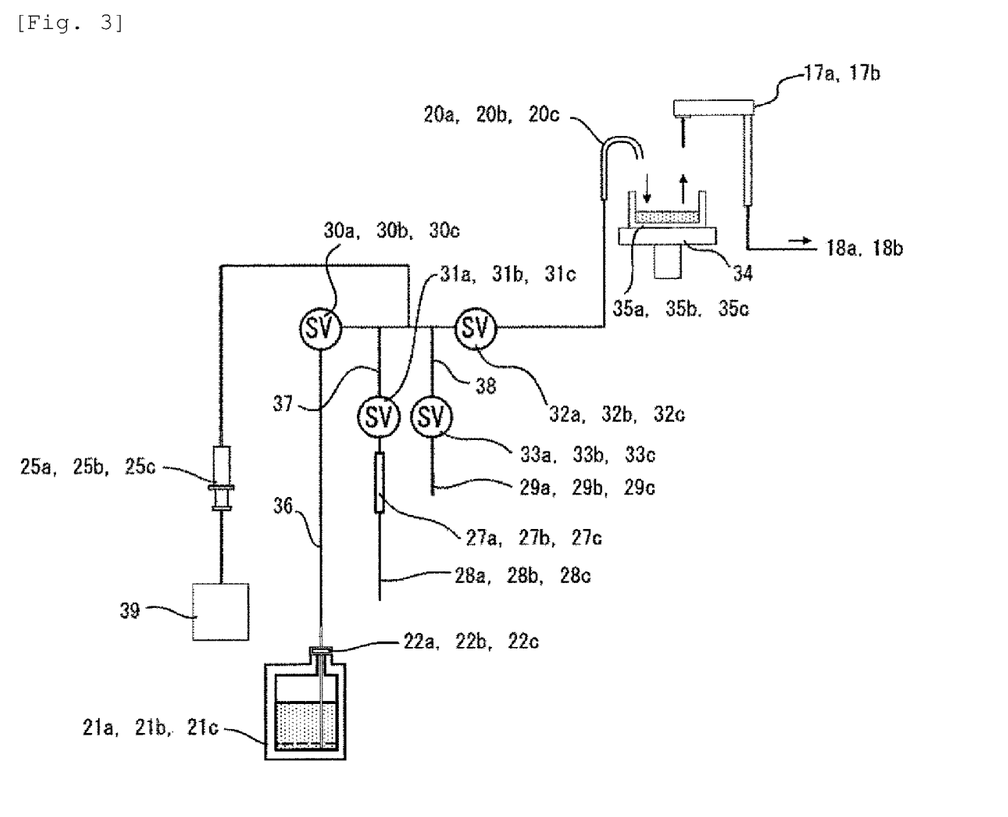
FIG. 3 is a configuration view illustrating a flow path of the surrounding of the external reagent container used in the automatic analysis device in the embodiment of the present invention.

Next, components around the external reagent containers 21a, 21b, and 21c which are used in the automatic analysis device 100 as an embodiment of the present invention and the flow path structure thereof will be described referring to FIG. 3.

The flow path for an external reagent includes: a reagent container holding portion that exchangeably holds an external reagent container accommodating a reagent; a reagent storage flow path that stores a portion of the reagent in the external reagent container; a first flow path that supplies the reagent to a measurement portion in the reagent container; a second flow path that is branched off from the first flow path and connected to the reagent storage flow path; liquid sending means for sending the reagent to the measurement portion and the reagent storage flow path by applying a negative pressure or positive pressure to the first flow path and the second flow path; a valve that is at least provided on the first flow path and the second flow path; and control means for controlling the valve and the liquid sending means so that a supply source which supplies a reagent to the measurement portion at a predetermined timing is switched from the reagent container to the reagent storage flow path.

The external reagent container 21a, 21b, 21c is connected to the reagent supply nozzle 20a, 20b, 20c through the first flow path 36 and between them, a reagent container side electromagnetic valves 30a, 30b, 30c, and a reagent supply nozzle side electromagnetic valve 32a, 32b, 32c are disposed. By pulling the reagent syringe 25a, 25b, 25c with only the reagent container side electromagnetic valve 30a, 30b, 30c open and pushing the reagent syringe 25a, 25b, 25c with only the reagent container side electromagnetic valve 32a, 32b, 32c open, the reagent is supplied from the external reagent container 21a, 21b, 21c through the reagent supply nozzle 20a, 20b, 20c to a reservoir cup 35a, 35b, 35c installed in a reservoir 34. In the reservoir 34, a reaction container supplied from the incubator and the reservoir cup 35a, 35b, 35c provided specially for each reagent are placed. The reagent supplied from each of the reservoir cups 35a, 35b, and 35c and the reaction liquid in the reaction container are both sucked by the nozzles 17a and 17b and sent to the detection units 18a and 18b.

Furthermore, the external reagent container 21a, 21b, 21c is also connected to the reagent storage flow path 27a, 27b, 27c through the second flow path 37 branched off from the first flow path 36 and between them, a reagent storage flow path side electromagnetic valve 31a, 31b, 31c is disposed. By pulling the reagent syringe 25a, 25b, 25c with only the reagent container side electromagnetic valve 30a, 30b, 30c open and pushing the reagent syringe 25a, 25b, 25c with only the reagent storage flow path side electromagnetic valve 31a, 31b, 31c open, the reagent is supplied from the external reagent container 21a, 21b, 21c to the reagent storage flow path 27a, 27b, 27c. The liquid in the reagent storage flow path 27a, 27b, 27c is discharged through the reagent storage flow path dedicated discarding liquid flow path 28a, 28b, 28c to the liquid discarding portion (not shown).

In addition, the reagent storage flow path 27a, 27b, 27c is connected to the reagent supply nozzle 20a, 20b, 20c and between them, a reagent storage flow path side electromagnetic valve 31a, 31b, 31c and a reagent supply nozzle side electromagnetic valve 32a, 32b, 32c are disposed. By pulling the reagent syringe 25a, 25b, 25c with only the reagent storage flow path side electromagnetic valve 31a, 31b, 31c open and pushing the reagent syringe 25a, 25b, 25c with only the reagent supply nozzle side electromagnetic valve 32a, 32b, 32c open, the reagent is supplied from the reagent storage flow path 27a, 27b, 27c to the reagent supply nozzle 20a, 20b, 20c.

A common discarding liquid flow path 29a, 29b, 29c is connected to a third flow path 38 branched off from the first flow path. By pulling the reagent syringe 25a, 25b, 25c while an electromagnetic valve paired with the flow path in which the liquid to be discharged is transported is open, and pushing the reagent syringe 25a, 25b, 25c with only the common discarding liquid flow path side electromagnetic valve 33a, 33b, 33c open, the liquid inside the flow path concerned is discharged through the common discarding liquid flow path 29a, 29b, 29c to the liquid discarding portion (not shown).

System water is supplied by a system water supply unit 39 connected to the reagent syringes 25a, 25b, and 25c.

The capacity of the reagent storage flow path 27a, 27b, 27c (flow path width and length) should be determined so that the time period in which analysis can be continued by reagent supply from the reagent storage flow path is equal to or longer than the estimated reagent container exchange time period. Therefore, as shown in the figure, the reagent storage flow path 27 need not always have a larger diameter than the second flow path 37 and the second flow path 37 may be sufficiently long and formed as a flow path integrated with the reagent storage flow path 27 and reagent flow path dedicated discarding liquid flow path 28.

In the present invention, since the reagent storage flow path 27a, 27b, 27c is disposed in the second flow path 37 branched off from the first flow path 36, even if the reagent container is exchanged with a portion of the reagent being stored in the reagent storage flow path 27a, 27b, 27c, the reagents before and after exchange are not mixed in the reagent storage flow path 27a, 27b, 27c. Therefore, even when a reagent which is easily damaged due to change in pH as a result of mixing of reagents of the same type from different lots is handled, degradation of the reagent due to contamination can be prevented and thus a significant decline in analysis performance attributable to the use of a damaged reagent can be avoided.

Figure 4:
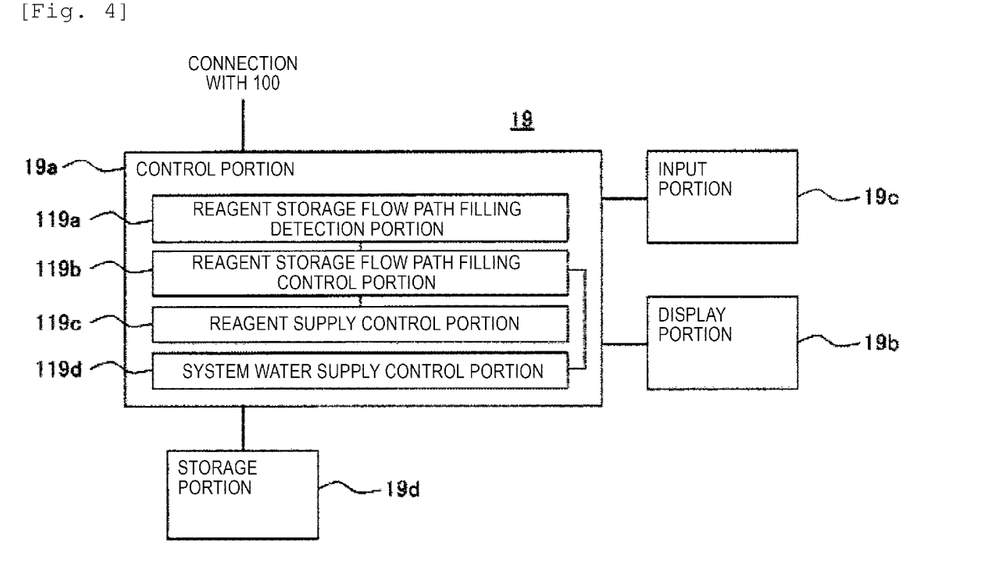
FIG. 4 is a view for explaining a function of a control device used in the automatic analysis device in the embodiment of the present invention.

FIG. 4 is a functional block diagram of the control device 19 which is used in the automatic analysis device 100 as an embodiment of the present invention. The function of the control device 19 which is used in the automatic analysis device 100 as an embodiment of the present invention is described below, referring to FIG. 4. The control device 19 controls the operation of the entire automatic analysis device 100.

The control device 19 controls sample analysis, exchange of a reagent container, filling of the reagent storage flow paths 27a, 27b, and 27c with a reagent and so on according to a preset program or an instruction entered by the user through the input portion 19c or the like. It has a control portion 19a which performs operation control of the automatic analysis device 100 and processes an analysis result, and a keyboard, mouse, touch panel, buttons and the like, and includes: an input portion 19c which is used to enter information concerning the sample and analysis item and settings therefor, triggers to start and end the exchange of an external reagent container and sends information to the control portion 19a as necessary; a display portion 19b which includes a display and indicators and displays a setting input screen for analysis, an analysis result, the content of a detected abnormality, a message to urge exchange of the external reagent containers 21a, 21b, and 21c, and information including timing of switching of the external reagent containers 21a, 21b, and 21c; and a storage portion 19d which stores information concerning analysis-related settings and samples and reagents, etc., analysis results, information on the reagent remaining amount of each of the external reagent containers 21a, 21b, and 21c, information concerning the usage of reagents in the reagent storage flow paths 27a, 27b, and 27c, information concerning the time period from filling of the reagent storage flow paths 27a, 27b, and 27c with a reagent until the present time, and so on.

The control portion 19a includes a reagent storage flow path filling detection portion 119a, a reagent storage flow path filling control portion 119b, a reagent supply control portion 119c, and a system water supply control portion 119d.

The reagent storage flow path filling detection portion 119a is a functional block which detects a trigger to fill the reagent storage flow path 27a, 27b, 27c with a reagent for the external reagent containers 21a, 21b, 21c. Specifically, it acquires information concerning the usage of reagents in the reagent storage flow path 27a, 27b, 27c and the time period from filling of the reagent storage flow paths 27a, 27b, 27c with a reagent until the present time, from the storage portion 19d and checks whether or not it is timing to fill the reagent storage flow paths 27a, 27b, 27c with a reagent according to the acquired information. Concrete details will be given later referring to FIG. 6. As a consequence, when it is decided that it is necessary to fill the reagent storage flow paths 27a, 27b, 27c with a reagent, the reagent storage flow path filling control portion 119b is notified of the decision.

In this embodiment, for example, 12 hours may be set as the maximum time period in which the reagent filled in the reagent storage flow path 27a, 27b, 27c may be left unused, which means that the reagent must be exchanged upon elapse of 12 hours or more. The maximum allowable non-use period is not limited to 12 hours and it may be set depending on the type of reagent. Also, in this embodiment, only the timing to fill the reagent storage flow path with a reagent is confirmed only at the start of analysis or during analysis, but the timing may also be confirmed while the device is in a standby state or another state.

The reagent storage flow path filling control portion 119b is a functional block which controls filling of the reagent storage flow path 27a, 27b, 27c with a reagent according to notification from the reagent storage flow path filling detection portion 119a. Specifically, it controls the electromagnetic valves and syringe so that the reagent storage flow path 27a, 27b, 27c is filled with the amount of reagent which enables analysis in the time period estimated to be required to exchange the old external reagent container 21a, 21b, 21c to be exchanged for a reason such as exhaustion, for a new reagent container.

The reagent supply control portion 119c is a functional block which controls the flow path for supplying a reagent, according to an instruction from the reagent storage flow path filling control portion 119b. Specifically, it controls the reagent syringes 25a, 25b, and 25c, reagent container side electromagnetic valves 30a, 30b, and 30c, reagent storage flow path side electromagnetic valves 31a, 31b, and 31c, reagent supply nozzle side electromagnetic valves 32a, 32b, and 32c, and common discarding liquid flow path side electromagnetic valves 33a, 33b, and 33c, depending on whether a reagent is supplied to the reagent supply nozzles 20a, 20b, and 20c from the external reagent containers 21a, 21b, and 21c or from the reagent storage flow paths 27a, 27b, and 27c.

The system water supply control portion 119b is a functional block which controls the flow path for supplying system water, according to an instruction from the reagent storage flow path filling control portion 119b. Specifically, it controls the reagent syringes 25a, 25b, and 25c, reagent storage flow path side electromagnetic valves 31a, 31b, and 31c, reagent supply nozzle side electromagnetic valves 32a, 32b, and 32c, and common discarding liquid flow path side electromagnetic valves 33a, 33b, and 33c, depending on whether a reagent is supplied to the reagent supply nozzles 20a, 20b, and 20c from the external reagent containers 21a, 21b, and 21c or from the reagent storage flow paths 27a, 27b, and 27c.

Figure 5:
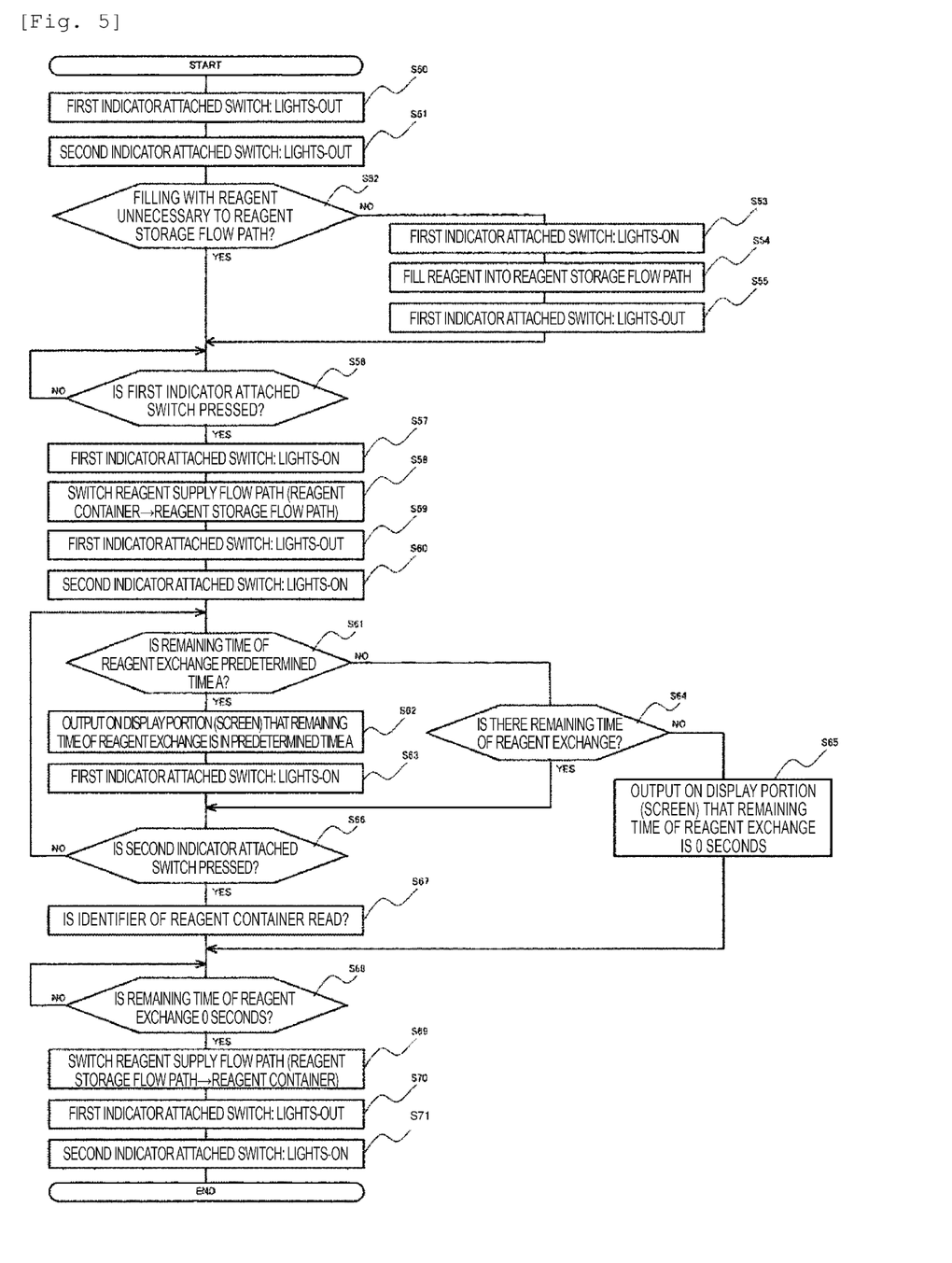
FIG. 5 is a flow chart illustrating exchange logic of the external reagent container in the automatic analysis device in the embodiment of the present invention.

FIG. 5 is a flowchart which shows an embodiment in which the external reagent container 21a, 21b, 21c is exchanged during analysis. Reagent exchange in the automatic analysis device 100 as an embodiment of the present invention is explained below referring to FIG. 5.

When an analysis is started, the initial state of the first indicator attached switch 23a, 23b, 23c before exchange of the external reagent container 21a, 21b, 21c is that the light is turned out (Step S50) and the initial state of the second indicator attached switch 24a, 24b, 24c is that the light is turned out (Step S52).

If the reagent storage flow path filling detection portion 119a decides that it is necessary to fill the reagent storage flow path 27a, 27b, 27c with a reagent (Step S52: NO), the reagent storage flow path filling detection portion 119a instructs the reagent storage flow path filling control portion 119b to perform a process to fill the reagent storage flow path 27a, 27b, 27c with the reagent. First, the lamp of the first indicator attached switch 23a, 23b, 23c is turned on to inform the user that it is timing when the external reagent container cannot be exchanged (Step S53). Next, the reagent storage flow path 27a, 27b, 27c is filled with a reagent from the external reagent container 21a, 21b, 21c (Step S54). Lastly, the lamp of the first indicator attached switch 23a, 23b, 23c is turned out to inform that it is timing when exchange of the external reagent container can be started (Step S55). The conditions under which the reagent storage flow path 27a, 27b, 27c must be filled with a reagent are as mentioned earlier.

If the reagent storage flow path filling detection portion 119a decides that it is unnecessary to fill the reagent storage flow path 27a, 27b, 27c with a reagent (Step S52: YES), the reagent storage flow path filling detection portion 119a does not issue an instruction to the reagent storage flow path filling control portion 119b, so that the process to fill the reagent storage flow path 27a, 27b, 27c with a reagent is not performed.

The reagent exchange process is not performed (standby state) until the first indicator attached switch 23a, 23b, 23c is pressed (Step S56: NO).

If the first indicator attached switch 23a, 23b, 23c is pressed by the user (Step S56: YES), the reagent storage flow path filling control portion 119b starts the reagent exchange process. First, the lamp of the first indicator attached switch 23a, 23b, 23c is turned on to inform the user that it is timing when the external reagent container cannot be exchanged (Step S57). Then, the flow path for supplying a reagent is switched from the external reagent container 21a, 21b, 21c to the reagent storage flow path 27a, 27b, 27c (Step S58). After switching of the flow path is finished, the lamp of the first indicator attached switch 23a, 23b, 23c is turned out to inform that exchange of the external reagent container can be started (Step S59)), and the lamp of the second indicator attached switch 24a, 24b, 24c is turned on to inform that the external reagent container is in use (Step S60).

If the remaining time for exchange of the external reagent container 21a, 21b, 21c reaches predetermined time A as the first timeout time (Step S61: YES), the display portion 19b shows on the screen that there is little time remaining for reagent exchange (Step S62) and the lamp of the first indicator attached switch flashes (Step S63). Then, the reagent exchange process is not performed (standby state) until the second indicator attached switch 24a, 24b, 24c is pressed (Step S66: NO). The first timeout time as the remaining time for reagent exchange can be set, for example, to 30 seconds but the length of the remaining time is not limited to it.

If the remaining time for exchange of the external reagent container 21a, 21b, 21c is not the first timeout time (Step S61: NO) and there is some remaining time (Step S64: YES), the reagent exchange process is not performed (standby state) until the second indicator attached switch 24a, 24b, 24c is pressed (Step S66: NO).

If the second indicator attached switch 24a, 24b, 24c is pressed (Step S66: YES), the individual identification marker of the external reagent container 21a, 21b, 21c held on the external reagent container holding portion is read by the reader and the identification information is sent to the control portion 19a of the control device 19 (Step S67). Information such as the type of the external reagent container 21a, 21b, 21c and lot number is identified by this identification information. Then, the reagent exchange process is not performed (standby state) until the remaining time for exchange of the external reagent container 21a, 21b, 21c becomes 0 second (Step S68: NO).

If the remaining time for exchange of the external reagent container 21a, 21b, 21c reaches the second timeout time (Step S68: YES), the flow path for supplying a reagent to the reagent supply nozzle 20a, 20b, 20c is switched from the reagent storage flow path 27a, 27b, 27c to the external reagent container 21a, 21b, 21c (Step S69) and the lamp of the first indicator attached switch 23a, 23b, 23c is turned out (Step S70) and the lamp of the second indicator attached switch 24a, 24b, 24c is turned out (Step S71). As the second timeout time, the remaining time is set, for example, to 0 second.

On the other hand, if the second timeout time is reached without exchange of the external reagent container 21a, 21b, 21c (Step S64: NO), the display portion 19b shows on the screen that the reagent exchange time has expired (Step S65). Then, the flow path for supplying a reagent is switched from the reagent storage flow path 27a, 27b, 27c to the external reagent container 21a, 21b, 21c to (Step S69) and the lamp of the first indicator attached switch 23a, 23b, 23c is turned out (Step S70) and the lamp of the second indicator attached switch 24a, 24b or 24c is turned out (Step S71). In this case, since the external reagent container is not exchanged, measurement is stopped.

As mentioned above, in the period from Step S58 to Step S69, analysis operation is continued using the reagent stored in the reagent storage flow path. In this period, the device does not access the external reagent container, so the operator can exchange the external reagent container. In addition, after completion of exchange of the external reagent container is detected at S66, the reagent supply source is automatically switched to a new external reagent container and thus the analysis operation is not interrupted by exchange of the external reagent container.

Figure 6:
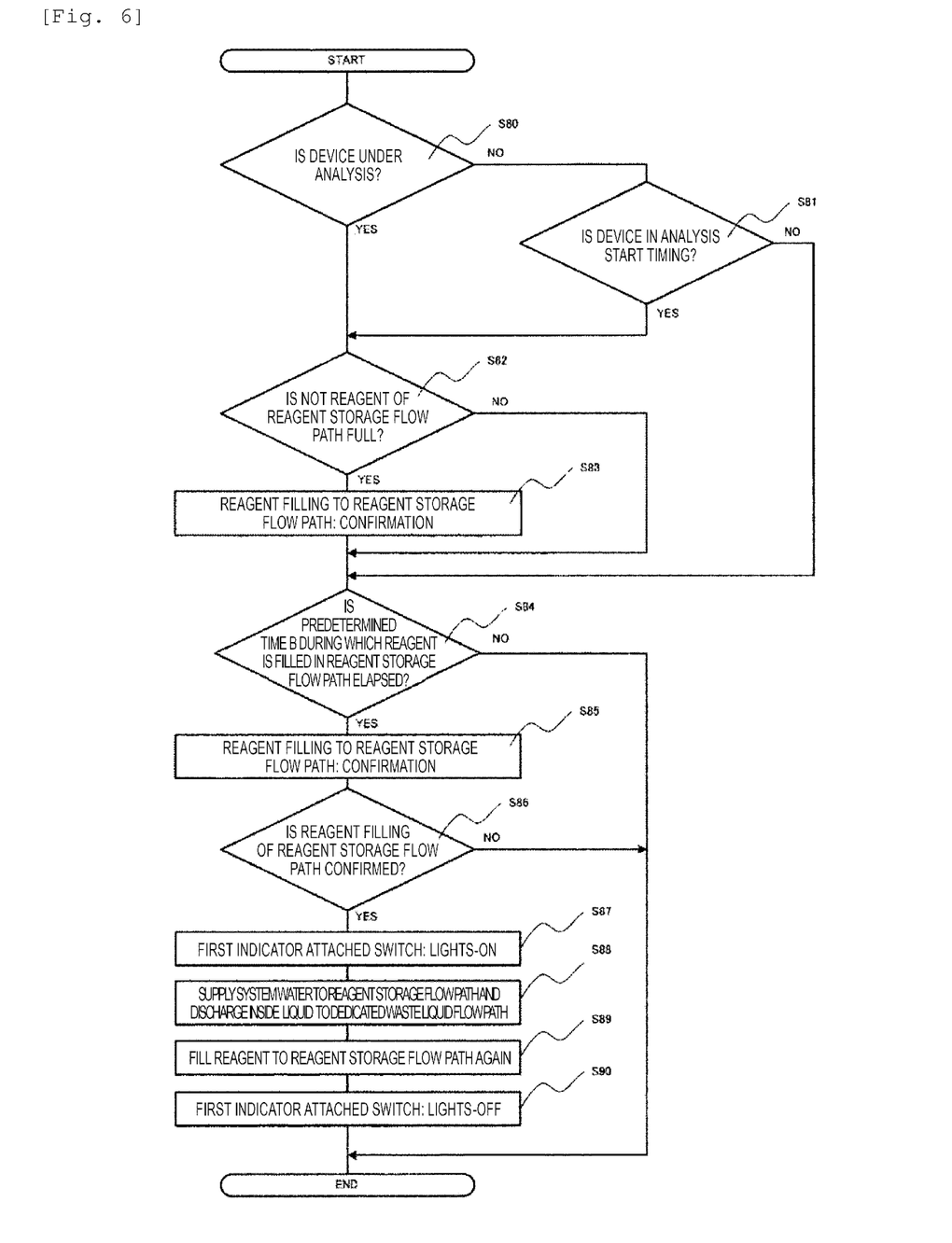
FIG. 6 is a flow chart illustrating displacement logic of a reagent of a reagent storage flow path in the automatic analysis device in the embodiment of the present invention.

FIG. 6 is a flowchart which shows the process to exchange the reagent filled in the reagent storage flow path 27a, 27b, 27c. The process to exchange the reagent in the reagent storage flow path 27a, 27b, 27c is explained below referring to FIG. 6.

First, the reagent storage flow path filling detection portion 119a checks the present state of the device and if the device is found to be "under analysis" (Step S80: YES) or if the device is found to be "in analysis start timing" (Step S80: NO, Step S81: YES), it checks whether the reagent storage flow path 27a, 27b or 27c is full or not. If the reagent storage flow path 27a, 27b, 27c is "not full" (Step S82: YES), the reagent storage flow path filling detection portion 119a decides that it is necessary to fill the reagent storage flow path 27a, 27b, 27c with a reagent and stores the decision in the storage portion 19d (Step S83). If the device is neither "under analysis" nor "in analysis start timing" (Step S80: NO, Step 81: NO), the sequence goes to the next step.

Next, if the reagent storage flow path filling detection portion 119a decides that a predetermined time (time B) has not elapsed after filling of the reagent storage flow path 27a, 27b, 27c with a reagent (Step S84: NO), it waits until the predetermined time elapses. The predetermined time B is, for example, 12 hours or so, but the length of the predetermined time is not limited to it.

If the reagent storage flow path filling detection portion 119a decides that the predetermined time B has elapsed after filling of the reagent storage flow path 27a, 27b, 27c with a reagent (Step S84: YES), the reagent storage flow path filling detection portion 119a decides that it is necessary to fill the reagent storage flow path 27a, 27b, 27c with a reagent and stores the decision in the storage portion 19d (Step S85).

Lastly, if the storage portion 19d stores the decision that it is necessary to fill the reagent storage flow path 27a, 27b, 27c with a reagent (Step S86: YES), the reagent storage flow path filling detection portion 119a instructs the reagent storage flow path filling control portion 119b to turn on the lamp of the first indicator attached switch 23a, 23b, 23c (Step S87). The reagent storage flow path filling control portion 119b instructs the system water supply control portion 119d to supply system water to the reagent storage flow path 27a, 27b, 27c and discharge the inside liquid to the reagent storage flow path dedicated discarding liquid flow path 28a, 28b, 28c (Step S88). System water is supplied when the system water supply unit 14 and the reagent syringe 25a, 25b, 25c connected to it through the flow path are operated. After that, the reagent storage flow path filling control portion 119b instructs the reagent supply control portion 119c to fill the reagent storage flow path 27a, 27b, 27c with a reagent from the external reagent container 21a, 21b, 21c again (Step S89).

After filling of the reagent storage flow path 27a, 27b, 27c with a reagent is ended, the reagent storage flow path filling control portion 119b turns off the first indicator attached switch 23a, 23b, 23c (Step S90).

On the other hand, if the storage portion 19d does not store the decision that it is necessary to fill the reagent storage flow path 27a, 27b, 27c with a reagent (Step S86: NO), nothing is performed.

Although not shown in the figure, when the power to the device is turned off, like the above Step S87, system water is sent to the reagent storage flow path 27a, 27b, 27c so that the reagent in the reagent storage flow path 27a, 27b, 27c is discharged and the inside liquid is replaced by the system water.

As explained above, the waiting time during which the reagent filled in the reagent storage flow path 27a, 27b, 27c stands by is monitored and upon detection of expiration of waiting time, the reagent storage flow path 27a, 27b, 27c is cleaned and the reagent is replaced by a fresh reagent, thereby eliminating the risk that the reagent stagnates in the reagent storage flow path 27a, 27b, 27c and in the worst case, bacteria grow in the reagent storage flow path 27a, 27b, 27c.

Furthermore, since the liquid in the reagent storage flow path 27a, 27b, 27c is discharged periodically, even if bubbles have entered the reagent storage flow path 27a, 27b, 27c, the bubbles are discharged to the discarding (waste) liquid flow path. This can prevent deterioration in the reagent dispensing performance due to bubbles.

Figure 7:
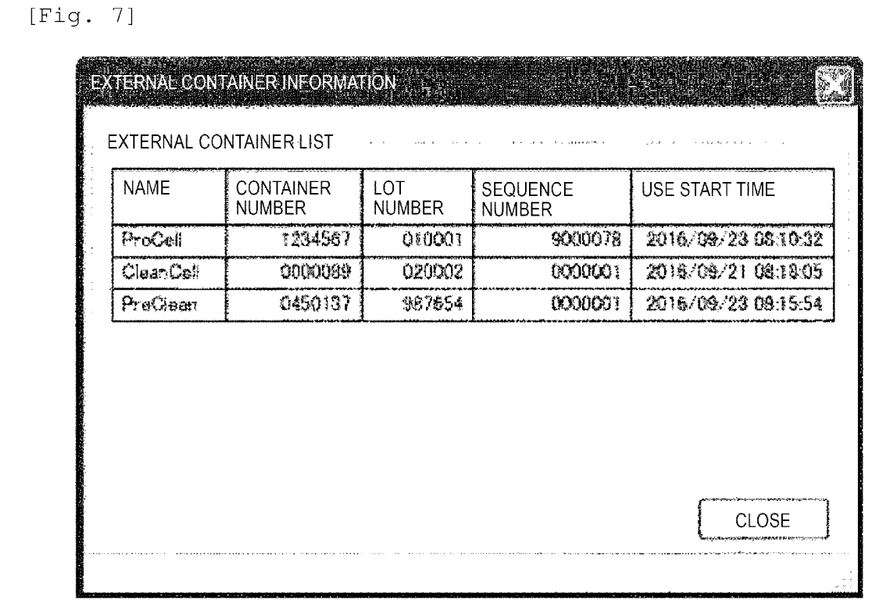
FIG. 7 is a configuration view illustrating an external container information screen in the automatic analysis device in the embodiment of the present invention.

FIG. 7 is a configuration view illustrating an embodiment of an external container information screen which lists the information on external containers including the external reagent containers 21a, 21b, and 21c. The external container information screen is explained below, referring to FIG. 7.

The external container information screen lists the information on various external containers which are loaded in the automatic analysis device 100. The displayed information should at least include the name of the liquid in a container, the container number indicating the type of container, lot number, the sequence number as information for identification in the same lot, and use start time. The use start time means the timing when the reagent supply source is switched from the reagent storage flow path 27a, 27b, 27c to the external reagent container 21a, 21b, 21c after all the reagent in the reagent storage flow path 27a, 27b, 27c is consumed, at the time of exchange of the external reagent container 21a, 21b or 21c. Therefore, the external container information screen is updated when the flow path for supplying a reagent is switched from the reagent storage flow path 27a, 27b, 27c to the external reagent container 21a, 21b, 21c. The external container information screen is closed by pressing the CLOSE button.

In this embodiment, the displayed external container information is a list of only three types of external containers, but the number of types is not limited.

Figure 8:
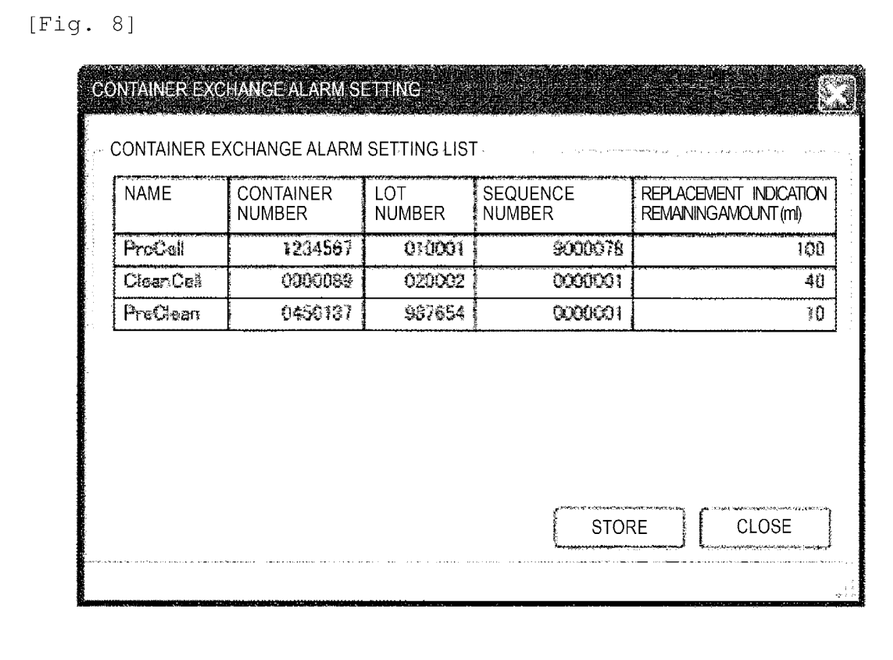
FIG. 8 is a configuration view illustrating a container exchange alarm setting screen in the automatic analysis device in the embodiment of the present invention.

FIG. 8 is a configuration view illustrating an embodiment of a container exchange alarm setting screen to set the remaining amount to indicate exchange timing for external containers including the external reagent containers 21a, 21b and 21c, in which it is used in an alarm function to urge reagent exchange at the timing when the remaining amount to indicate exchange timing as specified by the user is reached. The container exchange alarm setting screen is described using FIG. 8.

The container exchange alarm setting screen lists the information on various external containers loaded in the automatic analysis device 100 so that the remaining amount to indicate exchange timing can be entered for them. The displayed information should at least include the name of the liquid in a container, the container number indicating the type of container, lot number, the sequence number as information for identification in the same lot, and the current set value of remaining amount to indicate exchange timing. The remaining amount to indicate exchange timing means the remaining amount corresponding to the timing when a message to urge exchange of the external reagent container 21a, 21b, 21c is sent to the display portion 19b. The user enters a numerical value in the replacement indication remaining amount column on the container exchange alarm setting screen and presses the STORE button to update the set value. The container exchange alarm setting screen is closed by pressing the CLOSE button.

The automatic analysis device 100 issues an alarm to urge exchange of the container when the remaining amount in the external reagent container 21a, 21b, 21c reaches the set value on the container exchange alarm setting screen, and when the remaining amount becomes 0. Therefore, the user can make a setting to know the reagent exchange timing, according to the application purpose.

REFERENCE SIGNS LIST

1 SAMPLE CONTAINER
2 SAMPLE CONTAINER RACK
3 RACK TRANSFER LINE
5 REAGENT REFRIGERATOR
6a, 6b, 6c EXTERNAL REAGENT HOLDER
7 REAGENT REFRIGERATOR COVER
7a REAGENT REFRIGERATOR COVER OPENING PORTION
8 REACTION CONTAINER
9 INCUBATOR DISC
10 SAMPLE DISPENSING MECHANISM
11 REAGENT DISPENSING MECHANISM
12 REACTION CONTAINER—SAMPLE DISPENSING TIP STOREGE PORTION
13 REACTION CONTAINER—SAMPLE DISPENSING TIP SUPPLY PORTION
15 DISCARDING PORTION
16 TRANSPORT MECHANISM
16a TIP MOUNTING POSITION
17a, 17b NOZZLE
18a, 18b DETECTION UNIT
19 CONTROL DEVICE
19a CONTROL PORTION
19b DISPLAY PORTION
19c INPUT PORTION
19d STORAGE PORTION
20a, 20b, 20c EXTERNAL REAGENT SUPPLY NOZZLE
21a, 21b, 21c EXTERNAL REAGENT CONTAINER
22a, 22b, 22c TUBE LIFTER
23a, 23b, 23c FIRST INDICATOR ATTACHED SWITCH
24a, 24b, 24c SECOND INDICATOR ATTACHED SWITCH
25a, 25b, 25c REAGENT SYRINGE
26 FRONT SURFACE COVER
27a, 27b, 27c REAGENT STORAGE FLOW PATH
28a, 28b, 28c REAGENT STORAGE FLOW PATH DEDICATED DISCARDING LIQUID FLOW PATH
29a, 29b, 29c COMMON DISCARDING LIQUID FLOW PATH
30a, 30b, 30c REAGENT STORAGE SIDE ELECTROMAGNETIC VALVE
31a, 31b, 31c REAGENT STORAGE FLOW PATH SIDE ELECTROMAGNETIC VALVE
32a, 32b, 32c REAGENT SUPPLY NOZZLE SIDE ELECTROMAGNETIC VALVE
33a, 33b, 33c COMMON DISCARDING LIQUID FLOW PATH SIDE ELECTROMAGNETIC VALVE
34 RESERVOIR
35a, 35b, 35c RESERVOIR CUP
36 FIRST FLOW PATH
37 SECOND FLOW PATH
38 THIRD FLOW PATH
39 SYSTEM WATER SUPPLY UNIT
100 AUTOMATIC ANALYSIS DEVICE
119a REAGENT STORAGE FLOW PATH FILLING DETECTION PORTION
119b REAGENT STORAGE FLOW PATH FILLING CONTROL PORTION
119c REAGENT SUPPLY CONTROL PORTION
119d SYSTEM WATER SUPPLY CONTROL PORTION

The invention claimed is:

1. An automatic analysis device, comprising:
a reagent container holding portion that exchangeably holds a reagent container accommodating a reagent;
a first flow path that supplies the reagent in the reagent container to a measurement portion;
a second flow path that is branched from the first flow path;
a reagent storage flow path that is connected to the second flow path and is configured to store a portion of the reagent in the reagent container;
a reagent supply side electromagnetic valve that is provided on the first flow path;
a reagent container side electromagnetic valve that is provided on the first flow path;
a reagent storage flow path side electromagnetic valve that is disposed between the second flow path and the reagent storage flow path;
a syringe that is pulled with the reagent container side electromagnetic valve open and pushed with the reagent storage flow path side electromagnetic valve open to supply the reagent from the reagent container to the storage flow path; and
a controller configured to pull the syringe with the reagent storage flow path side electromagnetic valve open and push the syringe with the reagent supply side electromagnetic valve open to supply the reagent from the reagent storage flow path to the measurement portion at a predetermined timing.

2. The automatic analysis device according to claim 1, wherein the controller is configured to control the reagent container side electromagnetic valve and the reagent storage flow path side electromagnetic valve and the syringe in order to store the reagent to the reagent storage flow path when detecting a predetermined trigger.

3. The automatic analysis device according to claim 1, further comprising:
a discarding liquid flow path that is disposed by being branched to the first flow path and discards liquid in the first flow path,
wherein the controller is configured to discard the reagent stored in the reagent storage flow path to the discarding liquid flow path when detecting a predetermined trigger.

4. The automatic analysis device according to claim 2, wherein the predetermined trigger is any of a signal notifying start of reagent exchange, a signal notifying that input to input means by an operator is detected, a signal notifying that a reagent remaining amount reaches a predetermined remaining amount, or a signal notifying that access of the operator to the reagent container is detected.

5. The automatic analysis device according to claim 3, wherein the predetermined trigger is that the control means detects that predetermined time elapses from a timing storing the reagent in the reagent storage flow path.

6. The automatic analysis device according to claim 1, further comprising:
a sensor that detects whether or not an end of the first flow path is inserted in the reagent container,
wherein the predetermined timing is a timing which detects that the end of the first flow path is pulled out from an inside of the reagent container by the sensor.

7. The automatic analysis device according to claim 1, further comprising:
a reagent registration switch that supports a reagent registration,
wherein the predetermined timing is a timing when the reagent registration switch is input.

8. The automatic analysis device according to claim 1, further comprising:
a first indicator that indicates whether or not the reagent container is exchanged,
wherein the controller is configured to control an indicating state of the first indicator according to a processing status.

9. The automatic analysis device according to claim 1, further comprising:
a second indicator that indicates a state of the reagent container,
wherein the controller is configured to control an indicating state of the second indicator according to a supply status of the reagent to the reagent storage flow path.

10. The automatic analysis device according to claim 1, further comprising:
display means for receiving a notification of a time when the reagent is exhausted in the reagent storage flow path from the controller and displaying a use start time of the reagent.

11. The automatic analysis device according to claim 1, wherein a timing when system water is supplied includes a timing when a time after the reagent is filled in the reagent storage flow path reaches a predetermined time.

12. The automatic analysis device according to claim 1, further comprising:
wherein the controller is configured to control so as to supply system water to the reagent storage flow path, when the cutting off of the power supply to the automatic analysis device is instructed.

* * * * *